Oct. 29, 1968     A. B. VOSSELLER     3,407,892
POWER DRIVEN GOLF CART
Filed Jan. 9, 1967     3 Sheets-Sheet 1
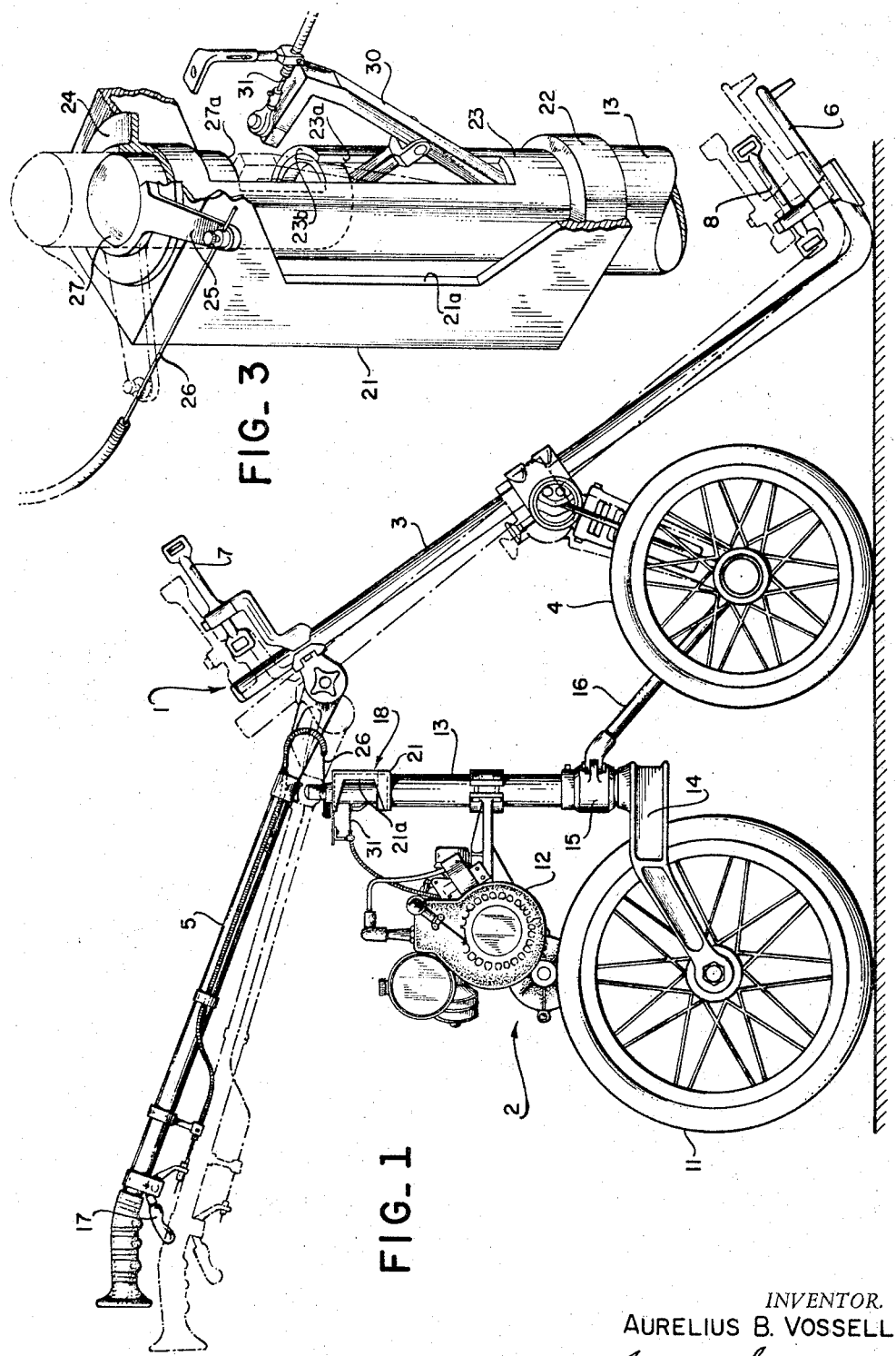
INVENTOR.
AURELIUS B. VOSSELLER
George C. Sullivan
Agent
Albert H. Geer
Attorney

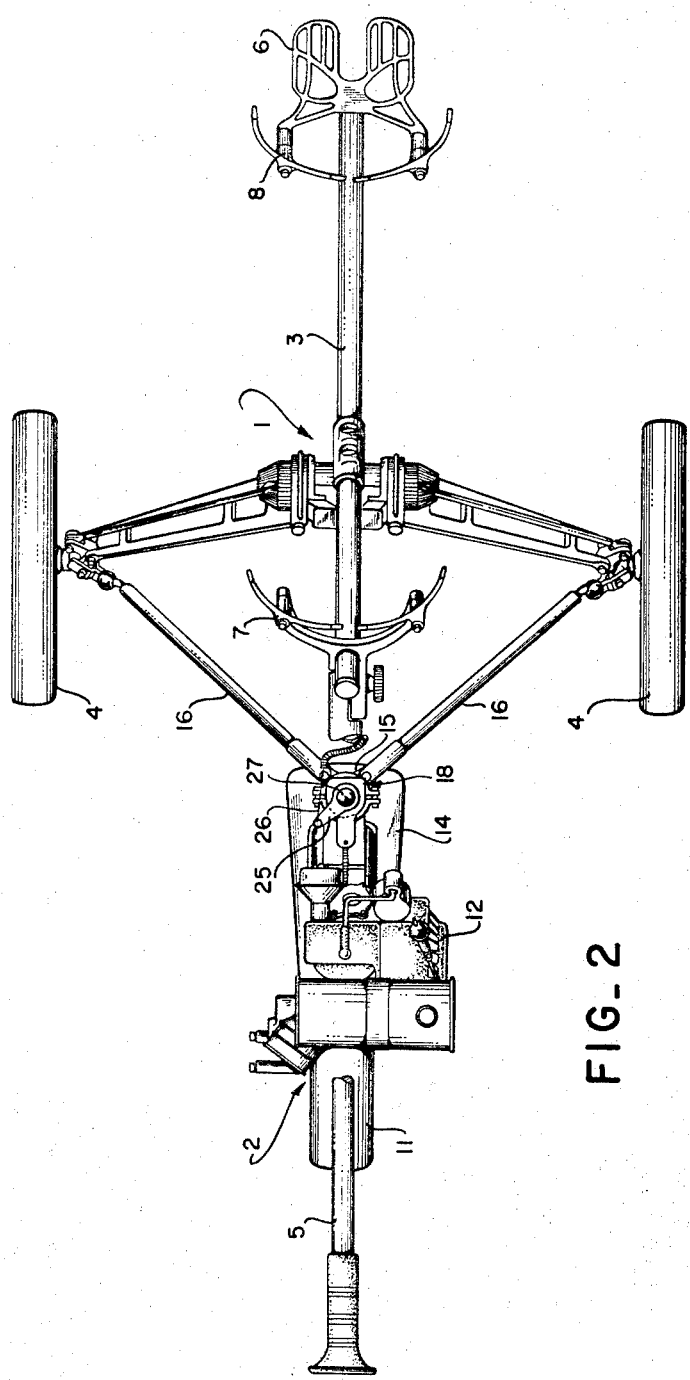

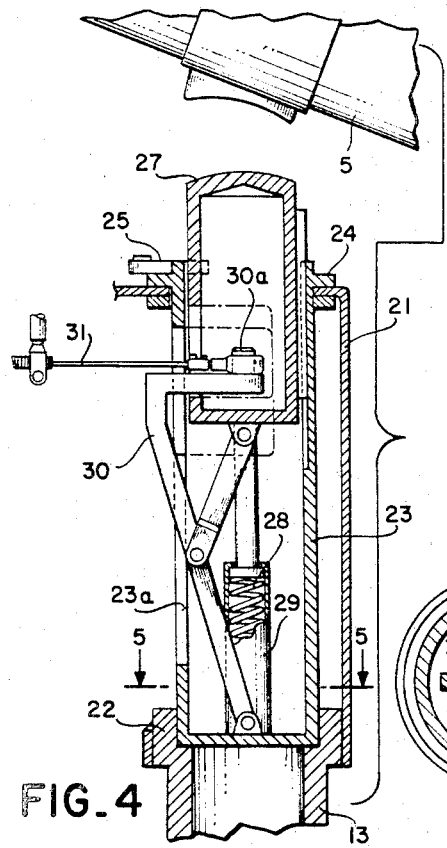
FIG_4
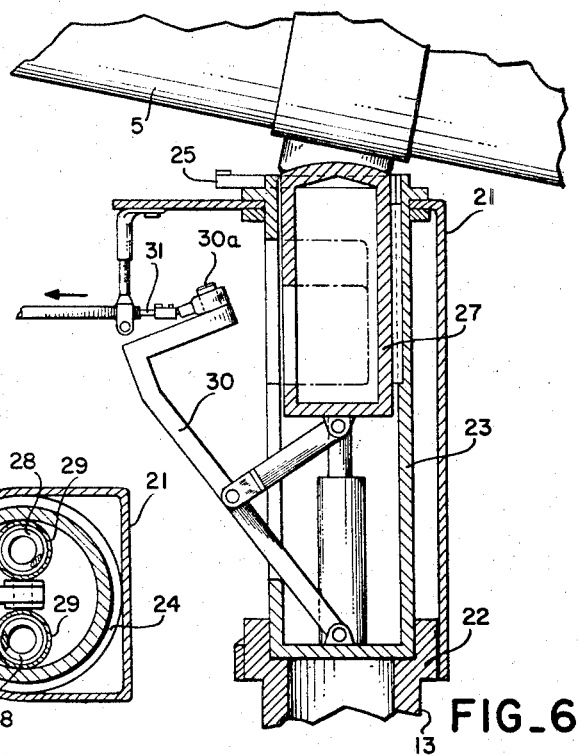
FIG_6
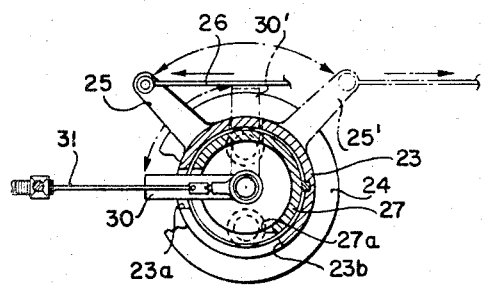
FIG_5
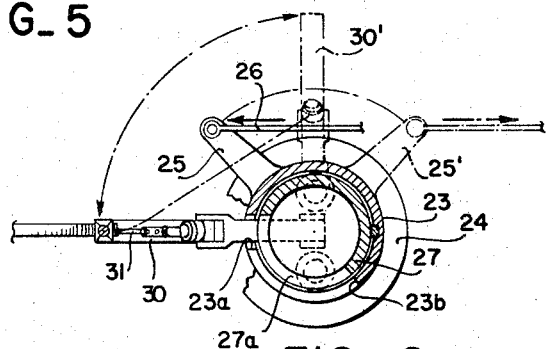
FIG_7    FIG_8
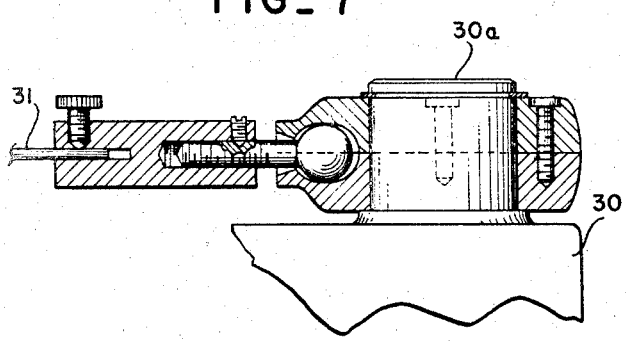
FIG_9
*INVENTOR.*
AURELIUS B. VOSSELLER United States Patent Office 3,407,892
Patented Oct. 29, 1968

3,407,892
POWER DRIVEN GOLF CART
Aurelius B. Vosseller, 66 Ave. Henri Martin,
Paris XVI, France
Filed Jan. 9, 1967, Ser. No. 608,210
3 Claims. (Cl. 180—19)

ABSTRACT OF THE DISCLOSURE

A golf cart or the like having a detachable power-driven wheel assembly. A speed control mechanism is located on the assembly adjacent the cart handle. A linkage to which the throttle control is connected is operated by lowering the handle, to move the throttle from idle to a pre-set run position.

This invention relates to a power-driven golf cart and more particularly to a control for such carts.

Power-driven or manually propelled carts for carrying the golf bag and accessories are well-known. Power-driven carts are usually driven by electric or gasoline engines and some may include provisions for carrying the golfer as well as his golf equipment. The latter type carts are usually bulky and expensive, limiting the use thereof to the golf course. The present invention is primarily directed to the smaller carts for carrying the golf bag and accessories.

Presently known golf bag carts of the power driven type, whether electric or gasoline powered, have certain undesirable features. The motor or engine must be stopped and started each time the golfer makes a play or the golfer must manually adjust the speed of the motor or engine to provide idle or operating speed as desired.

A primary object of the invention is to provide an improved power-driven golf cart.

Another object of the invention is to provide a semi-automatic speed control for power driven golf carts.

These and other objects of the invention will be more readily understood and appreciated from the following description when taken with the accompanying drawings wherein:

FIG. 1 is a side view in elevation of a golf cart embodying the invention.

FIG. 2 is a plan view of FIG. 1 with a portion of the handle omitted for clarity.

FIG. 3 is a perspective view of the control mechanism in accordance with the invention.

FIG. 4 is a side view partly in cross section illustrating the control mechanism in idle position.

FIG. 5 is a plan view of the control mechanism shown in FIG. 4 taken on the line 5—5.

FIG. 6 is a side view partly in cross section illustrating the control mechanism in operating position.

FIG. 7 is a composite plan view of the control mechanism shown in FIG. 4, to facilitate explanation.

FIG. 8 is a composite plan view of the control mechanism shown in FIG. 6.

FIG. 9 is a side view partly in cross section of a typical universal joint.

Referring now to FIG. 1, a standard collapsible golf cart generally designated at 1 is provided with a power drive generally designated at 2. The cart 1 comprises a frame 3 supported by a pair of wheels 4, and a handle 5. A bag support 6 is attached to the bottom portion of the frame. Bag retaining means 7 and 8 are located at the top and bottom, respectively, of the frame as indicated.

The drive means 2 comprises a castered wheel 11, which is driven by an engine 12. The wheel is attached to the post 13 by means of the fork 14. The post 13 is rotatably mounted in a sleeve 15, which is in turn centered between and behind the cart wheels 4 by means of the arms 16. One end of each arm is attached to the sleeve, and the other end of each arm is removably attached to the cart adjacent each wheel 4 as seen in FIG. 2. Thus attached, the sleeve 15 remains in a fixed position relative to the cart, thereby allowing the post 13 to rotate on a substantially fixed axis; i.e., the wheel 11 freely casters about the axis through post 13 and the sleeve 15.

An engine and transmission 12, indicated as a small gasoline engine preferably having a centrifugal clutch, is rigidly mounted on the post 13 and rotates with the post 13 and wheel 11. Power from the engine is delivered to the wheel 11 in any conventional manner. A manual throttle control lever 17 is conveniently mounted on the handle adjacent the hand grip.

A control mechanism 18 mounted at the top of post 13 will now be described with reference to FIGS. 2 through 7. A mounting bracket 21 is attached to the top of post 13 by means of collar 22. As indicated in FIG. 3, the bracket includes an open side area at 21a, for purposes to be explained hereinafter. A cylindrical body 23 is rotatably positioned in the collar 22 and extends up through the bracket as indicated. A flange 24 is attached to the top of the cylinder and together with the collar 22 provide bearing surfaces for the cylinder. Control arm 25 to which is attached the manual throttle control cable 26 is attached to the cylinder 23 to provide rotation of the cylinder by manipulation of the manual control lever 17 (FIG. 1).

A plunger member 27 is located within the cylinder 23 and normally biased in the upper position (FIG. 4) by means of a pair of springs 28 which are contained in the tubes 29. A key and guide prevent relative rotation between the plunger and cylinder. A linkage 30 is attached between the bottom of the plunger 27 and the bottom of the cylinder 23, as shown. The top of the plunger mates with a complementary surface on the handle 5. As best seen in FIG. 3, the cylinder 23 has a vertical slot 23a and a horizontal slot 23b located at the top of the vertical slot. Plunger 27 is provided with a horizontal slot 27a. A control wire 31 is connected between a linkage projection 30a and the engine throttle. The linkage is an adaptation of the well-known Scott-Russell motion.

Thus, it is apparent that by lowering the handle 5, the plunger is depressed, causing the linkage 30 to move from the position shown in FIG. 4 to that shown in FIG. 6. Furthermore, as the linkage moves from one position to the other, it is apparent that the engine throttle may be varied, say from idle speed to run speed, by simply lowering the handle.

Now with reference to FIGS. 7 and 8 the composite operation of the control mechanism will be considered. For ease of understanding, the linkage 30 and control wire are shown in the same positions as illustrated in FIGS. 4 and 6, respectively, whereas the control arm 25 is shown as movable between a solid line position and a broken line position.

When the handle 5 is in the raised position, as in FIGS. 4 and 7, the linkage projection 30a, to which the control wire is connected by means of a suitable universal coupling (such as illustrated in FIG. 9), lies substantially on the center axis of the control mechanism. As the control arm 25 moves to the broken line position 25', the cylinder 23 is also rotated, and due to the vertical slot 23a, the linkage 30 moves to the broken line position 30'. It is to be noted that the pivot point of the control wire remains on the center axis. The open sides of the bracket and horizontal slots 23b and 27a in the cylinder and plunger prevent interference with the control wire 31 as the cylinder is rotated. This is the fully retarded or idle setting.

When the handle 5 is lowered as in FIGS. 6 and 8, the plunger is depressed, the linkage projection 30a (inner end of the control wire) is moved to the solid line position. In this position the throttle is fully advanced and the engine is running at full speed. Movement of the control arm 25 toward the broken line position in FIG. 8 likewise rotates the linkage pivot point and thereby retards the throttle setting proportional to the movement of the arm 25.

The control arm 25 has been shown as being rotated through approximately 90° for clarity. It is believed apparent that about a 60° rotation will provide full manual control from full speed to a fully retarded or idle speed. It is also apparent that the engine speed will vary from an idle speed (handle raised) to a pre-set run speed (handle lowered). Manipulation of manual control lever provides variation of the run speed as desired.

What is claimed is:
1. In a self-propelled vehicle such as a golf cart and the like having
    an elongated frame provided with an article carrying member at one end and a handle attached to the other end, a pair of wheels attached to said frame and about which said frame is pivoted by lowering of said handle, at least one driven wheel positioned between and behind said pair of wheels, engine means including a throttle for driving said one wheel; an improved control mechanism comprising means connected to said throttle and engageable by said handle and responsive to lowering and raising of said handle for increasing and decreasing the engine speed, respectively, and including manual means for setting the engine throttle.

2. In a self-propelled vehicle as defined by claim 1,
    wherein said control mechanism comprises a rotatable cylinder, a plunger located in the upper end of the cylinder, disposed beneath said handle and resiliently biased to extend above said upper end and adapted to be depressed by lowering the handle, a linkage connected between the plunger and cylinder and a control wire connected between the linkage and the engine throttle whereby lowering the handle depresses the plunger and moves the linkage from an idle position to a run position, said manual means further including means for rotating said cylinder.

3. In a vehicle as defined by claim 1,
    wherein said control mechanism comprises a rotatable body, linkage means connected to said body and rotatable therewith, throttle control means connected to said linkage means, resiliently biased means responsive to lowering of said handle for actuating the linkage means and varying the throttle control means from idle to running speed and said manual means further including means for rotating said body.

References Cited

UNITED STATES PATENTS 2,962,106    11/1960    Burnside et al.

A. HARRY LEVY, *Primary Examiner.*